US012500732B2

(12) United States Patent
Gupta et al.

(10) Patent No.: US 12,500,732 B2
(45) Date of Patent: Dec. 16, 2025

(54) METHODS OF OPERATING ON DATA IN A FULLY HOMOMORPHIC ENCRYPTION SYSTEM USING IN-SITU PROCESSING-IN-MEMORY AND RELATED CIRCUITS

(71) Applicant: The Regents of the University of California, Oakland, CA (US)

(72) Inventors: Saransh Gupta, La Jolla, CA (US); Tajana Simunic Rosing, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 193 days.

(21) Appl. No.: 18/152,313

(22) Filed: Jan. 10, 2023

(65) Prior Publication Data

US 2023/0291541 A1  Sep. 14, 2023

Related U.S. Application Data

(60) Provisional application No. 63/297,910, filed on Jan. 10, 2022.

(51) Int. Cl.
*H04L 9/00* (2022.01)
*H04L 9/08* (2006.01)
*H04L 9/30* (2006.01)

(52) U.S. Cl.
CPC ............ *H04L 9/008* (2013.01); *H04L 9/0825* (2013.01); *H04L 9/3026* (2013.01)

(58) Field of Classification Search
CPC ...... H04L 9/008; H04L 9/0825; H04L 9/3026
USPC .......................................................... 713/168
See application file for complete search history.

(56) References Cited

U.S. PATENT DOCUMENTS

| | | | |
|---|---|---|---|
| 10,778,408 B1* | 9/2020 | Khedr ...................... H04L 9/008 |
| 11,032,061 B2* | 6/2021 | Chen ...................... H04L 9/0631 |
| 11,196,539 B2* | 12/2021 | Lauter ...................... H04L 9/088 |
| 11,476,854 B2* | 10/2022 | Wang .................. H03K 19/1776 |
| 2019/0334694 A1* | 10/2019 | Chen ...................... H04L 9/0631 |
| 2020/0403781 A1* | 12/2020 | Gentry .................. H04L 9/3093 |

(Continued)

OTHER PUBLICATIONS

Nejatollahi, CryptoPIM: In-memory Acceleration for Lattice-based Cryptographic Hardware, Oct. 9, 2020 (Year: 2020).*

(Continued)

*Primary Examiner* — Lynn D Feild
*Assistant Examiner* — Saad Ahmad Abdullah
(74) *Attorney, Agent, or Firm* — Stanek Lemon Crouse & Meeks, PA

(57) ABSTRACT

A method of operating on encrypted data can be performed by receiving ciphertexts at a server that is configured to operate on the ciphertexts generated using a $3^{rd}$ generation RGSW based fully homomorphic encryption system, operating on the ciphertexts received at the server in response to requested operations to generate respective input ciphertexts including ciphertext polynomials and ciphertext integers that are representative of the input ciphertexts, and processing the input ciphertexts in a server processing-in-memory device, that is operatively coupled to the server, to perform operations on the input ciphertext using the server processing-in-memory device, in-situ.

16 Claims, 7 Drawing Sheets

(56) References Cited

U.S. PATENT DOCUMENTS

| | | | |
|---|---|---|---|
| 2022/0116198 A1* | 4/2022 | Na | H04L 9/3093 |
| 2022/0366059 A1* | 11/2022 | Sasidharan Rajalekshmi | G11C 11/4094 |
| 2022/0376890 A1* | 11/2022 | Eom | H04L 9/0891 |

OTHER PUBLICATIONS

Micciancio, Daniele, et al.; Bootstrapping in FHEW-like Cryptosystems; WAHC '21, Virtual Event, Republic of Korea; Nov. 15, 2021; pp. 17-28.

Zhou, Junwei, et al.; Deep Binarized Convolutional Neural Network Inferences over Encrypted Data; 2020 7th IEEE International Conference on Cyber Security and Cloud Computing (CSCloud)/2020 6th IEEE International Conference on Edge Computing and Scalable Cloud (EdgeCom); Aug. 2020; pp. 160-167.

Micciancio, Daniele, et al.; Bootstrapping in FHEW-like Cryptosystems; Duality Technologies; Jan. 28, 2020; pp. 1-22.

Lou, Quian, et al.; SHE: A Fast and Accurate Deep Neural Network for Encrypted Data; 33rd Conference on Neural Information Processing Systems (NeurIPS 2019); Dec. 2019; Vancouver, Canada; pp. 1-9.

Guimaraes, Antonio, et al.; Revisiting the functional bootstrap in TFHE; Research Gate; Feb. 2021; 26 pages.

\* cited by examiner

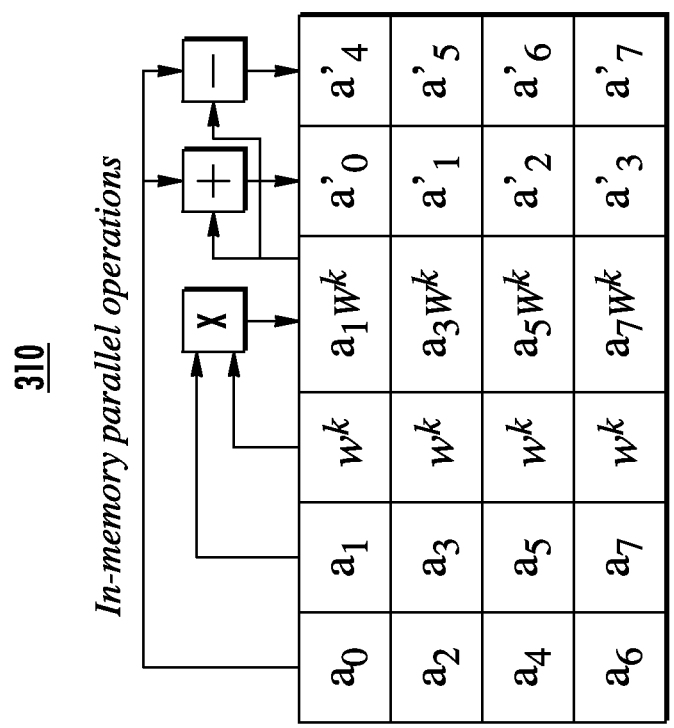
FIG. 3B
FIG. 3C
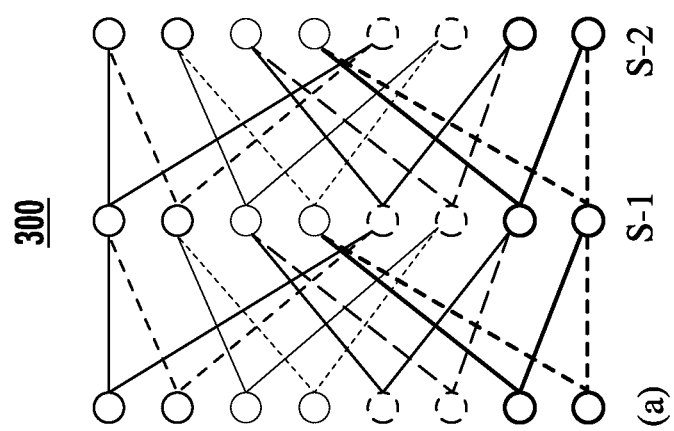
FIG. 3A

METHODS OF OPERATING ON DATA IN A FULLY HOMOMORPHIC ENCRYPTION SYSTEM USING IN-SITU PROCESSING-IN-MEMORY AND RELATED CIRCUITS

CLAIM FOR PRIORITY

The present Application claims priority to U.S. Provisional Application Ser. No. 63/297,910, titled MEM-THE: End-To-End Computing With Fully Homomorphic Encryption In Memory, filed in the U.S.P.T.O. on Jan. 10, 2022, the entire disclosure of which is hereby incorporated herein by reference.

STATEMENT OF FEDERAL SUPPORT

This invention was made with United States Government support under Award No. HR0011-18-3-0004, awarded by DARPA and under Grants #1527034, #1730158, #1826967, #1911095, and #2003279 awarded by the NSF. The government has certain rights in the invention.

FIELD

The present invention relates to the field of electronics in general, and more particularly, to encryption systems and devices.

BACKGROUND

The increasing amount of data and the growing complexity of problems has resulted in an ever-growing reliance on cloud computing. However, many applications, most notably in healthcare, finance or defense, demand security and privacy which today's solutions may not fully address. Fully homomorphic encryption (FHE) elevates the bar of today's solutions by adding confidentiality of data during processing. FHE allows computation on fully encrypted data without the need for decryption, which eliminates the need for private key exchanges and decrypting data at the server, raising the bar on security and privacy thus fully preserving privacy. To enable processing encrypted data at usable levels of classic security, e.g., 128-bit, the encryption procedure introduces noticeable data size expansion—the ciphertext is much bigger than the native aggregate of native data types.

However, computing on encrypted data can come at a huge data and computation cost, resulting in large performance and memory overheads. For example, encrypting an integer in homomorphic domain may increase its size from 4B to more than 20 KB. Moreover, homomorphically multiplying two FHE encrypted integers may require tens of millions of operations. Further, computing with encrypted data may limit the complexity of the function that can be evaluated for a set of encryption parameters.

Some FHE systems utilize a procedure, called bootstrapping, to reduce the growth of noise during function evaluation in FHE domain, allowing FHE to perform more complex operations. However, bootstrapping can be expensive and increases the latency of evaluating a homomorphic function by 100-1000×. While some recent work has made bootstrapping faster and computationally less expensive, bootstrapping still remains expensive and is the major limiting factor while using FHE to evaluate real workloads. The encryption keys used in such schemes may reach up to GBs in size, adding to the huge capacity and data transfer bottleneck of FHE.

Some work has proposed CPU and GPU implementations of RGSW-based FHE schemes. However, those schemes may not scale enough to provide the speedup needed to make FHE feasible. Most operations in these schemes are based on polynomials and vectors, which are difficult to accelerate due to the limited parallelism and data access provided by current systems.

Processing in-memory (PIM) may be useful in FHE since it provides extensive parallelism, bit-level granularity, and an extensive library of compatible operations which dramatically improving both performance and energy efficiency. PIM addresses the issue of large data movement by processing data in memory where it is stored.

SUMMARY

Embodiments according to the present invention can provide methods of operating on data in a fully homomorphic encryption system using in-situ processing-in-memory and related circuits. Pursuant to these embodiments, a method of operating on encrypted data can be performed by receiving ciphertexts at a server that is configured to operate on the ciphertexts generated using a $3^{rd}$ generation RGSW based fully homomorphic encryption system, operating on the ciphertexts received at the server in response to requested operations to generate respective input ciphertexts including ciphertext polynomials and ciphertext integers that are representative of the input ciphertexts, and processing the input ciphertexts in a server processing-in-memory device, that is operatively coupled to the server, to perform operations on the input ciphertext using the server processing-in-memory device, in-situ.

BRIEF DESCRIPTION OF THE DRAWINGS

FIG. 3A shows a signal flow graph for Singleton's FFT algorithm in some embodiments according to the invention.

FIG. 3B shows a data layout of one NTT stage in the MemFHE architecture shown in FIG. 1 in some embodiments according to the invention.

FIG. 3C shows a data transfer in each transfer phase for the NTT stage of FIG. 3B in some embodiments according to the invention.

DETAILED DESCRIPTION OF EMBODIMENTS ACCORDING TO THE INVENTION

Figure 1:
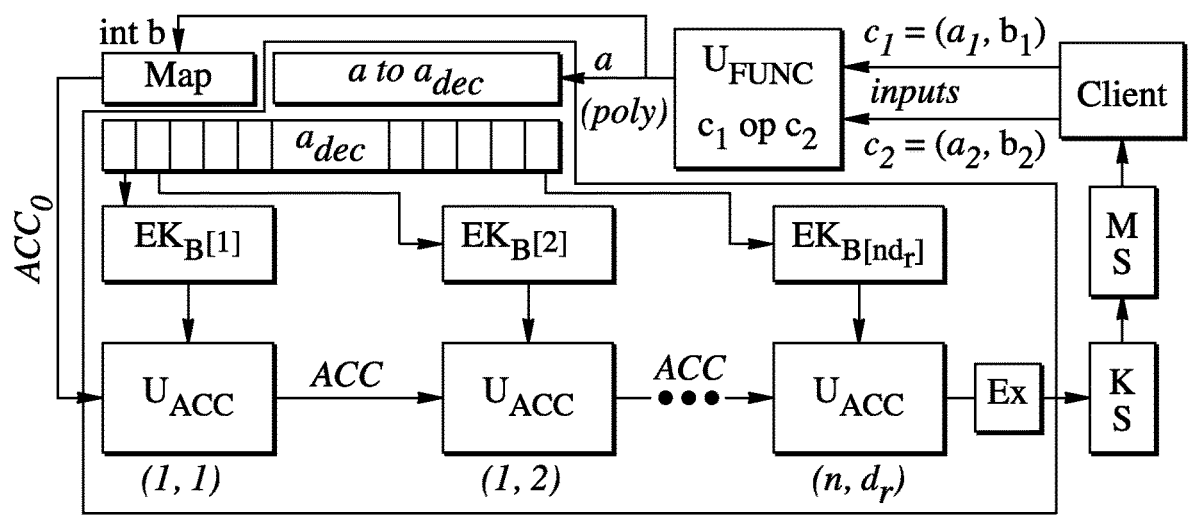
FIG. 1 is a schematic illustration of an overview of the MemFHE architecture in some embodiments according to the invention.

Exemplary embodiments of the present disclosure are described in detail with reference to the accompanying drawings. The disclosure may, however, be exemplified in many different forms and should not be construed as being limited to the specific exemplary embodiments set forth herein. Rather, these exemplary embodiments are provided so that this disclosure will be thorough and complete, and will fully convey the scope of the disclosure to those skilled in the art.

As described herein, in some embodiments according to the present invention, end-to-end acceleration of a FHE cryptosystem in memory, which sometimes referred to herein as "MemFHE." Unlike previous homomorphic encryption (HE) systems, which supported a library of functions, the latest RGSW-based cryptosystem can allow computing arbitrary functions on encrypted data. In some embodiments according to the invention, MemFHE can include at least two components: the client and the server PIM accelerators. The client PIM accelerator runs ultra-efficient in-memory operations to not only encode and decode data but also enables ring learning with errors (RLWE) to encrypt and decrypt data. The encrypted data (ciphertext), along with an encrypted version of a secret key, are sent to the server PIM accelerator for processing. The Server PIM receives the ciphertext from multiple clients and performs operations on ciphertext to generate output. To enable this, the server PIM uses PIM-enabled bootstrapping which keeps the accumulated noise low so that the output ciphertext can be decrypted by the intended client. This ciphertext is sent back to the client. Accordingly, in some embodiments, only the client has the means to decrypt the output ciphertext and access the unencrypted data.

As further described herein, in some embodiments according to the present invention, an end-to-end acceleration of fully homomorphic encryption in memory can be provided. MemFHE can accelerate both the encryption/decryption and the full FHE computation pipelines. MemFHE can employ ciphertext-level and operation level parallelism combined with operation-level pipelining to achieve orders of magnitude of performance improvement over the traditional systems. As further described herein PIM can be used to accelerate an application with high data dependency and little data-level parallelism. In some embodiments according to the present invention pipelining may increase latency by 3% while providing>1000× throughput improvement.

In some embodiments according to the present invention, the MemFHE server PIM design can include fast bootstrapping, key switching, and modulus switching in memory. It can distribute the key memory units to reduce the instances of data contention and can sequentially process different inputs in different pipeline stages for the best processing throughput.

In some embodiments according to the present invention, the MemFHE can accelerate the process of bootstrapping by using a highly pipelined architecture. MemFHE bootstrapping includes parallel accumulation units, which supports two different types of bootstrapping techniques. In some embodiments according to the present invention, the MemFHE can provide, for example, a core boot-strapping operation and a Number Theoretic Transform (NTT). In some embodiments according to the present invention, the MemFHE NTT doesn't require any special interconnect structure. Moreover, in some embodiments according to the present invention, the MemFHE can the MemFHE NTT can process many NTT stages without extra hardware.

In some embodiments according to the present invention, the MemFHE client PIM design can include encryption and decryption. MemFHE enables encryption efficiently in memory by exploiting bit-level access and accelerates dot product with a new in-memory implementation.

As described herein, MemFHE was evaluated for various security-levels and compared with state-of-the-art CPU implementations for Ring-GSW based FHE. In some embodiments according to the present invention, the MemFHE is up to 20k× (ie., 265×) faster than a CPU (GPU) implementation for FHE arithmetic operations and provides on average 2007× higher throughput while implementing neural networks with FHE.

MemFHE employs an end-to-end privacy-preserving computing system consisting of both client and server implementations. Our architecture is based on the FHEW cryptosystem which provides the slowest noise growth and hence is the most generally applicable class of FHE. MemFHE is implemented completely in memory, using homogeneous crossbar memory arrays and exploits PIM to implement all FHE operations.

All computations in the MemFHE-server happen in encrypted domain. It inputs the encrypted ciphertexts and performs the desired operations on the ciphertexts in the basic function unit, $U_{FUNC}$, without decrypting them. Computing in FHE domain leads to the accumulation of noise in the resultant ciphertext. To reduce this noise and keep it below the threshold, server utilizes the MemFHE-bootstrapping. Bootstrapping is the most important but also the slowest process in the MemFHE-server pipeline due to its iterative nature. Hence, we heavily pipeline bootstrapping architecture, so that the slowest operations in bootstrapping happens on different pipeline stages. We introduce novel architectures for various sub-components of bootstrapping and perform operation level optimizations in the bootstrapping core. As a result, MemFHE-server can achieve a high throughput of 170 inputs/ms even for high security parameters, which is 20k× higher than CPU.

In addition to the server, we also present MemFHE-client, which provides the input ciphertexts and receives the output of the server. The client is responsible for converting raw data into FHE domain, using a client-specific secret key. The client in FHEW cryptosystem encrypts a bit of data into an LWE ciphertext. MemFHE-client accelerates LWE utilizing efficient in-memory multiply-accumulation and shift operations. The encrypted ciphertext is sent to server along with an encrypted version of the client's secret key. Client also decrypts the output of FHE computation from the server into plaintext form.

1 MemFHE-Server Architecture

FIG. 1 shows an overview of the server's architecture 100. The goal of MemFHE's server is to provide a high throughput for operations on encrypted data. To achieve this, we create a deep pipeline. As discussed later and evaluated in experiments, bootstrapping is the major bottleneck of the server-side computations. Hence, we use the latency of the slowest bootstrapping stage (i.e., polynomial multiplication) to set the maximum latency of any pipeline-stage in the server. We next present in-memory implementations of all the server components.

1.1 FHEW Function Implementation

The main strength of FHEW lies in its ability to implement arbitrary functions. FHEW achieves this by translating each boolean function into one or more homomorphic computation steps and then mapping the integer output to a bootstrapping-compatible polynomial, $m_b$. Each element of $m_b$ is set to either Q/8 and −Q/8, the FHE equivalents of binary '1' and '0'. MemFHE allocates a memory block which stores these translations for all functions. Function implementation is the only process in MemFHE server that follows the client's parameters, n and q. FHEW uses polynomial addition, subtraction, and scaling by a constant as computing steps. For example, an AND between two bits is implemented by first homomorphically adding the corresponding ciphertexts (both the polynomial and the integer parts), followed by mapping the integer part of the output ciphertext to N-degree polynomial, $m_b$. Then, each coefficient of ml in [3q/8, 7q/8] is set to Q/8 and the others are set to −Q/8. A complete list of boolean gates and their corresponding FHEW translations are presented. MemFHE implements computation steps in a memory block, $U_{FUNC}$, executing polynomial additions and subtractions as described in Section 4. Scaling is performed using a series of shift-add operations. Since mapping happens within server's parameters, MemFHE performs it during the initialization stage of bootstrapping discussed in Section 2.1.

1.2 Bootstrapping

Implementing functions homomorphically in encrypted domain introduces noise in the ciphertext, which may make it impossible to decrypt the ciphertext. Bootstrapping reduces this accumulated noise. A majority of MemFHE's resources are dedicated to the bootstrapping core. MemFHE transfers the output of $U_{FUNC}$ to bootstrapping. The initialization phase of bootstrapping coverts the output of $U_{FUNC}$ into a server-compatible encryption and initializes a cryptographic accumulator, ACC. Then, bootstrapping utilizes a series of accumulation units, $U_{ACC}$, to modify the contents of ACC. The accumulation uses $EK_B$ to "decrypt away" the accumulated noise from the output of $U_{FUNC}$. MemFHE supports two types of accumulation schemes, AP and GINX. While GINX is more efficient for binary- and ternary-distributed secret keys, AP is more efficient in other cases. MemFHE chooses the accumulation scheme based on the client's encryption procedure. The output ciphertext with reduced-noise is then extracted from the ACC. Section 2 details the implementation of different bootstrapping steps in MemFHE.

1.3 Key Switching

Bootstrapping encrypts the output with a different key, $EK_B$ instead of the original key s. Key switching is performed to obtain an output encrypted with s, so that it can be decrypted by the client. It utilizes the switching key, EKs, which is sent by the client to the server along with the refreshing key, $EK_B$. Key switching uses a base $B_s$ that breaks the integers into $d_s$ digits. The N domain output of ACC gets converted to a client-compatible n. Key switching initializes a ciphertext, $c_s$, with an empty polynomial and the integer value of the extracted ACC. The ciphertext $c_s$ has the parameters n and Q. Each coefficient of the ACC polynomial part, selects elements (n, Q ciphertext) from $EK_s$ and then subtracts them from the existing value of $c_s$. This is repeated for $d_s$ iterations. At the end of each iteration, the ACC polynomial coefficients are divided by the switching base $B_s$.

All operations in key switching are performed modulo Q. MemFHE first implements ($d_s$−1) divisions as shown in FIG. 1. Since $B_s$ is known, MemFHE pre-computes and stores the value of $1/B_s$. Division is now a multiplication with $1/B_s$. To prevent losing data due to rounding errors, the multiplication with $1/B_s$ is performed in full precision, generating twice the number of bits than needed. This happens in parallel for all the coefficients in a row-parallel way. This is followed by a modulo operation with $B_s$. Here we utilize in-memory Montgomery reduction (Section 4) to obtain the modulus of the divided coefficients. Now, we have N×($d_s$−1) coefficients, that select as many ciphertexts from EKs, and perform sequential ciphertext subtractions. MemFHE employs a tree structure to subtract the ciphertexts. Each computing element of this tree is a memory block. Each blocks perform x sequential subtractions so that the total latency of these subtractions is less than the throughput of the design. Hence, we pipeline the tree stage-by-stage. It takes $\lceil \log_2(N\cdot(d_s-1)/x) \rceil$ tree stages to implement all the subtractions. Each subtraction is followed by Barrett reduction (Section 4 with modulo Q. The final output of the tree, $c_s$, is the key-switched output.

1.4 Modulus Switching

Lastly, the output of key switching is converted from a modulo Q ciphertext to a modulo q ciphertext. To achieve that, each element is multiplied with q and divided by Q and then rounded off to the nearest integer. MemFHE implements modulus switching in a single memory block. The key-switched ciphertext $c_s$, including its integer part, and is stored vertically in the memory block so that each coefficient is in a separate row. Similar to key switching, MemFHE prestores the value q/Q. All the ciphertext coefficients are hence multiplied with q/Q in a row parallel way. Then, a value of 0.5 is added to all the products in parallel using row-parallel addition as detailed in Section 4. Now, for each memory row, the integer part represents the integer nearest to the corresponding coefficient of $c_s \cdot (q/Q)$. We finally take modulus of the output with q. Since q is a power of 2 for all security parameters that MemFHE considers, modulo is equivalent to reading $\log_2 q$ LSBs of the output. If q is not a power of 2, we use Barrett reduction instead. The output of modulus switching, also the output of server, is a ciphertext with parameter n and q, encrypted with secret key, s of the client.

2 MemFHE Bootstrapping

Bootstrapping inputs an encrypted version of the private key, $EK_B$, also called the refreshing key, along with a ciphertext. The output is a ciphertext corresponding to the input ciphertext but with reduced noise. Bootstrapping performs iterative computations on a cryptographic accumulator, ACC. The process involves first initializing ACC with the input ciphertext, then implementing an iterative accumulation over ACC. Each accumulation involves a series of multiplication and addition operations over polynomials.

Finally, an element of the final ACC is extracted to obtain the output ciphertext. In this section, we discuss the implementation of each of these steps in MemFHE

2.1 Initialization

The initialization phase performs two tasks (i) setting the initial value of ACC and (ii) ensuring that the input ciphertext's polynomial is compatible with the decomposed refreshing key Initializing ACC:

MemFHE performs the mapping discussed in Section 1.1 in this phase. The coefficients of the bootstrapping-compatible polynomial, $m_b$, are each mapped to Q/8 and −Q/8 based on whether they lie inside or outside an operation-dependent range (lb, ub), [3q/8, 7q/8] in the case of AND. To implement this mapping operation in parallel for all the coefficients of $m_b$, we utilize search-based PIM operations. Using exact bitwise-search operations, MemFHE implements in-memory compare operation, which can search a set of memory columns for all the numbers greater, equal, or less than the query. The details of the operation are presented in Section 4. First MemFHE inputs lb as a query and searches for all the numbers greater than lb. Then, MemFHE performs searches for the numbers less than ub. The final filtered-out rows are initialized to Q/8, while the remaining rows are initialized to −Q/8. The resultant $m_b$ is the initial ACC value.

Polynomial's Compatibility with $EK_B$:

The input ciphertext's polynomial a, needs to be made compatible with the decomposed refreshing key, $EK_B$. The polynomial a undergoes the same set of operations as those discussed in key switching, except for subtractions, with parameters n, $B_r$, and $d_r$ instead of N, $B_s$, and $d_s$. It results in $n \times d_r$ coefficients for each input. We call them $a_{dec}$. For the bootstrapping pipeline to work, all of the $n \times d_r$ $U_{ACC}$ units should receive elements from $a_{dec}$s belonging to different inputs. Hence, we introduce an $n \times d_r$-sized register, in which word, is fed directly to $U_{ACC-i}$.

2.2 Accumulation

The inputs to the accumulation function include the decomposed representation of a ($a_{dec}$ from the initialization step, an RGSW encrypted refreshing key, $EK_B$, and the output of initialization step, a pair of polynomials of degree N. Accumulation preforms iterative multiplication of this key with ACC and then addition back to ACC. It is the slowest part of bootstrapping due to high data dependency between the iterations. It adds the result of multiplication in each iteration to the accumulator. The dependency of the input of one ciphertext element on the output of the previous one further prohibits the functions from being parallelized across the ciphertext elements. However, each ciphertext element is a high-degree polynomial, allowing parallelize over the polynomial length.

2.2.1 AP Bootstrapping: Traditionally, refreshing key is an n-dimensional vector where each element of the vector is either an N-degree polynomial or a pair of those. However, in AP bootstrapping instead of each element of $EK_B$ being an N-degree polynomial, it is a pair of $2d_g$ polynomials of degree N. Each dimension of the vector is further represented using the pair ($B_r$, $d_r$). Hence, the AP refreshing key is a three dimension matrix where each element of the matrix is a pair of $2d_g$ N-degree polynomials. MemFHE stores the refreshing key in $n \times d_r$ memory blocks such that each block stores $2B_r \cdot d_g$ polynomials. Each $EK_B$ memory block is assigned to the corresponding accumulation unit. The main computation of the AP bootstrapping is to perform accumulation function on ACC $n \times d_r$ times. Each step involves a multiplication of the current ACC value with an element of $EK_B$ as ACC←ACC $\diamond$ $EK_B$.

Figure 2:
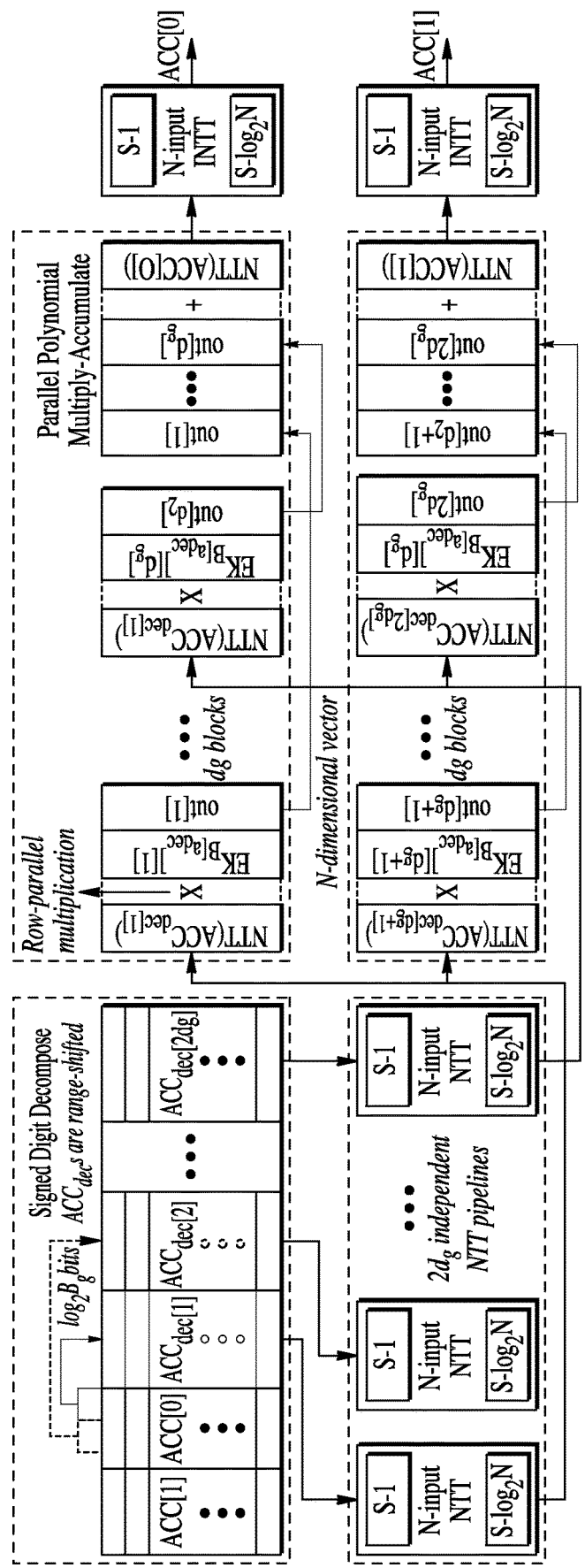
FIG. 2 is a schematic illustration of an accumulation unit included in the MemFHE architecture shown in FIG. 1 in some embodiments according to the invention.

Accumulation Unit ($U_{ACC}$):

FIG. 2 is a schematic illustration of an accumulation unit 200 included in the MemFHE architecture shown in FIG. 1 in some embodiments according to the invention. According to FIG. 2, a bootstrapping pipeline is provided such that the accumulation logic consists of $n \times d_r$ accumulation units, $U_{ACC}$. The unit address (i, j), where $0 \leq i < n$ and $0 \leq j < d_r$, corresponds to the $(i \times d_r + j)$th accumulation iteration. While the units cannot operate on multiple iterations of a single ciphertext in parallel, they can process different ciphertexts in a pipelined fashion. Each unit receives the corresponding value from $a_{dec}$ memory and uses it to select an element from $EK_B$ for multiplication. Since all units input $EK_B$ in each iteration, it introduces a fetch bottleneck at the $EK_B$. To reduce this problem, $EK_B$ is split over multiple memory blocks, with each $U_{ACC}$ having a local $EK_B$ memory. $EK_B$ is independent of inputs and populated once.

Since FHEW is based on RGSW encryption scheme, the multiplication in the accumulation stage happens on digit-decomposed operands to reduce the growth of noise. As explained later, the SDD tile in $U_{ACC}$ performs digit decomposition on the two N-degree polynomials of ACC, splitting each coefficient of ACC into $d_g$ numbers with $\log_2 B_g$ bits each. $EK_B$ is already digit-decomposed. The output of SDD tile, digit-decomposed $ACC_{dec}$, contains $2d_g$ polynomials of degree N, similar to each part of $EK_B$ pair polynomials. Now $U_{ACC}$ performs $4d_g$ polynomial-wise multiplications in parallel, $2d_g$ between $ACC_{dec}$ and each part of the $EK_B$ pair as shown in FIG. 2. To make the multiplication efficient, all the polynomials are converted in NTT domain before multiplying. $U_{ACC}$ employs $2d_g$ NTT pipelines and converts $ACC_{dec}$ into NTT domain. The details of our NTT pipeline are presented in Section 2.2.3. $EK_B$ is already in NTT domain. Polynomials in NTT domain are stored in a row-parallel way, such that each coefficient is stored in a separate row as shown in FIG. 2. Then, we perform row-parallel multiplication between the polynomials. After multiplication, all products are accumulated to generate a pair of polynomials that serve as the output ACC. Before sending the output to the next unit, $U_{ACC}$ converts it back to the coefficient (non-NTT).

Signed Digit Decompose (SDD):

Signed digit decompose (SDD) decomposes a pair of polynomials into multiple polynomials. The core operation is to break each polynomial coefficient (originally $\log_2 Q$ bits) into smaller $\log_2 B_g$ bit signed numbers. $B_g$ is always a power of 2, making the process simpler. SDD consists of one or more memory blocks which perform iterative modulus-division operations, as shown in FIG. 2. In each iteration, MemFHE selects $\log_2 B_g$ LSBs (remainder of the division by $B_g$) from the coefficients, preserving the remaining bits (quotient of the division). The selected LSBs represent the first $\log_2 B_g$-bit number. This process is repeated $d_g$ times, decomposing all coefficients into $d_g$ $\log_2 B_g$-bit numbers. Hence, in the beginning of each iteration, we first change the range of the coefficients from [0, Q) to [−Q/2, Q/2] by subtracting Q from all inputs in [Q/2, Q), mapping them to [−Q/2, 0). MemFHE implements this operation in parallel for all the coefficients of the input polynomial. Coefficients are stored in different rows, occupying the same set of memory columns. We search for all numbers greater than Q/2 using MemFHE's in-memory parallel compare operation discussed in Section 4. MemFHE then subtracts Q from all the filtered coefficients. Similarly, the selected LSBs (remainders) are sign-extended, where MemFHE copies the ($\log_2 B_g - 1$)th bit for all the coefficients in parallel. Then, all negative remainders are made positive. MemFHE achieves this by searching the MSB bits of all the remainders in parallel (one remainder per coefficient per iteration) and subtracting Q from the filtered remainders.

2.2.2 GINX Bootstrapping: The decision to run either AP or GINX bootstrapping is based on the type of secret key used by the client. GINX works better in case of binary and ternary secret keys, while AP works better for other. GINX bootstrapping differs from AP in two major ways. First, it utilizes binary secret keys, resulting in a smaller refreshing key $EK_B$. $EK_B$ in GINX has a dimension of n×2, instead of AP's $n \times B_r \times d_r$. Each element consists of $2d_g$ polynomials of degree N, the same as AP. Second, the bootstrapping function in GINX involves extra multiplicative and additive terms to generate the effect of input-dependent polynomial rotation. Specifically, the bootstrapping follows:

$$ACC \leftarrow ACC + (X^m - 1)(ACC \diamond EK_B),$$

where $m = \lfloor a(i) \times (2N/q) \rfloor$ for ith coefficient of the input ciphertext polynomial a. ($X^m - 1$) is a monomial representing GINX's "blind rotation" by m. This encodes the input in the form of the powers of polynomial. The state-of-the-art implementation PALISADE pre-computes ($X^m - 1$) for all possible values of $0 \leq m < 2N$ and maintains a library of their NTT counterparts. Based on the m corresponding to a $U_{ACC}$, PALISADE selects a value from the library and then multiply it with $U_{ACC}$'s output. This creates a data transfer bottleneck in a pipelined architecture like MemFHE's, where many units need to access the library simultaneously. On the contrary, MemFHE exploits the bit-level access provided by PIM to implement this "rotation" efficiently.

MemFHE uses the same architecture to implement GINX as that for AP. GINX requires $n \times 2\ U_{ACC}$ units. Here, unlike AP, $EK_B$ input to $U_{ACC}$ is independent of the polynomial part a of the ciphertext. Like in the case of AP, the SDD tile of $U_{ACC}$ first decomposes input ACC, $U_{ACC}$ then performs the same polynomial-wise multiplication and subsequent addition, and finally converts them to coefficient domain using INTT. Now, the output of addition represents prod=(ACC$\diamond EK_B$) in coefficient domain. We now perform in-memory row-parallel rotation on prod as discussed in Section 4. MemFHE finally adds the rotated prod, $prod_r$, to pre-decomposed ACC and finally subtracts prod. The output is the GINX accumulated ACC in coefficient domain.

2.2.3 NTT and INTT Pipeline. Number theoretic transform (NTT) is a generalization of fast Fourier transform (FFT) that performs transformation over a ring instead of complex numbers. In FHE, it is mainly used in polynomial multiplication where it converts a polynomial (by default in coefficient domain) into its frequency (NTT) domain equivalent. A polynomial multiplication in coefficient domain translates to an element-wise multiplication in NTT domain, enabling extensive parallelism for high-degree polynomials. However, the process of converting to and from NTT domain is complex. The state-of-the-art implementations of NTT utilize algorithms where the coefficient access pattern for an n-degree polynomial changes for each of the login stages of NTT pipeline. Instead, we utilize Singleton's FFT algorithm and later accelerated to implement MemFHE's NTT pipeline. FIG. 3A shows a signal flow graph 300 for Singleton's FFT algorithm in some embodiments according to the invention. According to FIG. 3A, it is observed that the coefficient access pattern for the algorithm remains the same for every stage. MemFHE exploits this property to avoid using NTT-specific interconnects.

Data Mapping:

FIG. 3B shows a data layout of one NTT stage 310 in the MemFHE architecture shown in FIG. 1 in some embodiments according to the invention.

We write an n-degree input polynomial, a, in n/2 rows such that a pair of coefficients with indices 2i and (2i+1) share the ith row of the memory block. All such pairs are hence written in separate rows, utilizing the same columns. A twiddle factor is associated with each pair, which is pre-computed and stored in the corresponding row. Each pair generates the ith and (i+n/2)th coefficients of the output polynomial in ith row of the block.

Computation:

Each NTT stage of MemFHE performs three compute operations. First, we perform row-parallel multiplication between the coefficients with odd indices (2i+1) and the corresponding twiddle factor W. Second, we add the generated products to the coefficients with even indices (2i) in a row-parallel way to generate the first n/2 coefficients of the output polynomial. Lastly, we subtract the products from the even-indexed coefficients in a row-parallel way to obtain the remaining output coefficients. The details of the row-parallel operation execution are presented in Section 4.

Stage-to-Stage Data Transfer:

FIG. 3C shows data transfers 315 in each transfer phase for the NTT stage of FIG. 3B in some embodiments according to the invention. According to FIG. 3C, a column-wise data transfer is performed, where each column consists of one bit from all (or a subset of) rows of the memory block. In one data transfer phase, q column transfers can transfer as many q-bit numbers as the rows in the memory. As discussed in data mapping, the output polynomial is present in n/2 rows such that indices [0, n/2−1] are stored in one set of columns and the remaining indices in the another set of columns. Hence, we need four data transfer phases. The first data transfer reads the even-indexed coefficients from [0, n/2−1] and write them to the next stage according to the data mapping scheme, while the second data transfer does the same for the even-indexed coefficients from [n/2, n−1]. Similarly, third and fourth data transfer phases deal with odd-indexed coefficients. These data transfers read selected rows from one memory block, send it over a conventional local interconnect, and write them at a contiguous location of the destination memory.

Operation Pipeline:

We pipeline our NTT implementation at the granularity of an NTT stage. Hence, the pipeline depth is given by the number of NTT stages: $(n \times d_r) \times (2\ \log_2 n + 2)$. Each stage works in parallel over different inputs. As discussed in Section 5, each MemFHE memory block contains 1024 rows. Hence, one memory block can implement an NTT stage for up to 2048-degree polynomial, requiring a total of 11 ($\log_2 2048$) memory block for whole NTT. For n<2048, we perform NTT over m=2048/n inputs at the same time in parallel, while requiring only login stages in the pipeline. In order to maintain the computation and data transfer characteristics, we interleave the inputs as shown in FIG. 3e. Here, the output throughput of the pipeline becomes mx the original throughput. For n>2048, MemFHE allocates multiple memory blocks per stage and implements a deeper pipeline. Since MemFHE's NTT is stage-wise pipelined, the throughput of the larger NTT is the same as that for n=2048.

Inverse NTT (INTT):

NTT and INTT utilize the same hardware and have identical data-mapping, computation, transfer, and pipelining schemes. The two operations differ only in the twiddle factors they use. During pre-compute step, INTT pipeline generates the twiddle factors, $w^{-k}$, which are inverse of those used in NTT. The rest of the process is the same.

2.3 Extraction

After accumulation, ACC consists of a pair of polynomials. Extraction is a simple mapping process that converts ACC to a ciphertext. The first polynomial of ACC represents the polynomial part of the bootstrapped output ciphertext. Whereas the constant term (corresponding to degree-0) of the second polynomial represents the integer part. To reverse the mapping operation that occurred during initialization phase, Q/8 is added (modulo Q) to the integer part.

3 MemFHE Client Architecture

3.1 Encryption

Client encryption converts a message bit, m, into a ciphertext of the type (a, b), where a is an integer polynomial of length n, while b is an integer. This encryption utilizes learning with errors (LWE) encryption technique and is defined as $LWE_s(m) = (a, b) = (a, (a \cdot s + e + m) \bmod q)$, where m' is an encoded version of m, s is the secret key, and e is an integer error added to the message.

Evaluating m' involves dividing the message, m, with a message modulus t and then multiplying the output with the application parameter, q/2. According to the state-of-the-art implementation and the security parameters in Section 5, t and q are always powers of 2. Hence, MemFHE scales m to m' using in-memory shift and add operations. We first extract the/opt LSBs of m. Then, in-memory multiplication with q/2 is simply a left shift operation on m % t by $\log_2(q/2)$. Since all the operations in encryption are done modulo q, we extract the $\log_2 q$ LSBs of the output. In the case when q is not a power of 2, we perform modulo operations as described in Section 4.

Generating integer b requires a dot product between vectors a and s, followed by adding e and m'. To generate this dot product, we utilize the secret key memory, $SK_{mem}$. It stores the vector corresponding to secret key s in a row-parallel way such that all the elements of s occupy the same set of memory bitlines and each element is stored in a different row. The incoming vector a is written such that the corresponding elements of a and s are present in the same row.

We implement row-parallel integer multiplication between the elements of the two vectors. Our row-parallel execution performs vector-wide multiplication with the same latency as that of a single multiplication, discussed in Section 4. This is followed by an addition of all the products. To add, we perform column parallel in-memory addition operations on the output products using the in-memory switching techniques instead of sense amplifier based operations. In the following discussion, we denote the bitwidth of each product (i.e. $\log_2 q$) with the letter p. Here, we accumulate each bit position independently, so that k p-bit numbers are reduced to p $\log_2$ k-bit numbers after (k−2) column parallel 1-bit additions for each of the p bit position. To further reduce the output to a single number, we transpose the output of column-parallel addition so that the outputs for all p columns are stored in the same row. It takes p data transfers, $\log_2$ k bits per transfer, to read the outputs column-wise and store them in a row. We then perform bit-serial addition to obtain the final integer output, which takes p×$\log_2$ k 1-bit additions. This output represents the dot product a·s, to which we add integers e and m'.

3.2 Decryption

Client decryption converts the server's output ciphertext, (a, b), back to a bit message, m, as Round $(4/q*(b - a \cdot s))$, where s is the client's private key. MemFHE first uses the dot product implementation of MemFHE's encryption to obtain a·s, followed by a subtraction operation with b. The subtraction is followed by a modulo q operation, where MemFHE simply reads the $\log_2$ q LSBs of the output. Scaling is done with 4/q by discarding the $\log_2(q/4)$ LSBs. Round(•) is implemented similar to the rounding function discussed during modulus switching in Section 1.4.

TABLE 1

MemFHE Security Parameters

| Set | Security | n | q | N | $\log_2 Q$ | $B_s$ | $B_g$ | $B_r$ |
|---|---|---|---|---|---|---|---|---|
| Classical | | | | | | | | |
| STD128 | 128-bit | 512 | 512 | 1024 | 27 | 25 | $2^7$ | 23 |
| STD192 | 192-bit | 512 | 512 | 2048 | 37 | 25 | $2^{13}$ | 23 |
| STD256 | 256-bit | 1024 | 1024 | 2048 | 29 | 25 | $2^{10}$ | 32 |
| Quantum - Safe | | | | | | | | |
| STD128Q | 128-bit | 512 | 512 | 2048 | 50 | 25 | $2^{25}$ | 23 |
| STD192Q | 192-bit | 1024 | 1024 | 2048 | 35 | 25 | $2^{12}$ | 32 |
| STD256Q | 256-bit | 1024 | 1024 | 2048 | 27 | 25 | $2^7$ | 32 |

4 MemFHE Computations

Here, we detail PIM implementation of MemFHE operations.

Vectorized Data Organization:

MemFHE implements vectorized-versions of its operations. An input vector, with n b-bit elements, is stored such that n elements occupy n different rows with but share the same b memory columns.

Row-Parallel Addition and Multiplication:

A b-bit addition in MemFHE is implemented using bit-wise AND, OR, and XOR and requires (6b+1) memory cycles. Similarly, multiplication is performed by generating partial products and serially adding them. MemFHE optimizes the multiplication by sharing the memory cells among intermediate outputs of addition and utilizing faster operations. This significantly reduces the time to perform full precision b-bit multiplication from $(13b^2 - 14b - 6)$ to $(7b^2 + 4b)$ memory cycles, while the total memory required reduces from (20b−5) to 13b. This increase the maximum possible multiplication bitwidth from 51 bits to 78 bits in MemFHE.

Modulus/Modulo:

Modulus operation gives the remainder of a division. In the context of FHE, modulus is used to avoid overflow during computation. Hence, most operations in MemFHE are followed by modulus. In most cases in MemFHE-server, modulus is taken with respect to a prime number. We perform PIM variants of Barrett (for addition) and Montgomery (for multiplication) reductions using shift and add operations. This requires prior knowledge of the modulus base, which is governed by the security parameters (and hence known) in MemFHE. If taken with respect to a power of 2, then modulus just selects the corresponding LSBs of the input.

Comparison:

Comparison operation in MemFHE can compare an input query with the data stored in MemFHE's memory blocks. We exploit the associative operations to search for a bit of data in a memory column. To compare data stored in b columns and r rows of a memory block with a b-bit query, we perform bit-by-bit search. Starting from MSB, associative search is applied for each memory column and all memory rows. Associative search circuit selects all rows where there is a mismatch between the stored and query bit.

Rotation:

Rotation in MemFHE is equivalent to reading out a memory row (column), bit-wise rotating them at the input register of the block and writing it back.

Shift:

MemFHE implements shift operation by simply selecting or deselecting bitlines for the corresponding LSB/MSBs. If sign-extension is required, then MemFHE copies the data stored at the original MSB bitline.

5 Evaluation 5.1 Simulation Setup

We simulate MemFHE using a cycle-accurate simulator. The simulator considers the memory block size (1024×1024 bits in our experiments), the precision for each operation, the degree of polynomials, the locations and the organization of the data. We use HSPICE for circuit-level simulations and calculate energy consumption and performance of all the MemFHE operations with 28 nm process node. We adopt an RRAM device with VTEAM model and switching delay of 1.1 ns. The parameters of the model have been set to mimic the behavior of practical RRAM memory chips. RRAM components of the design have a SET and RESET voltage of 2V and 1V respectively, with a high-to-low resistance ratio of 10MΩ/10 kΩ. A detailed list of parameters is presented in. However, the proposed architecture works with most processing in memory implementations based on digital data.

MemFHE is based on the FHEW cryptosystem of PALISADE library. We perform our evaluation over multiple security parameter sets summarized in Table 1.

5.2 MemFHE-Server Pipeline Analysis

Figure 4:
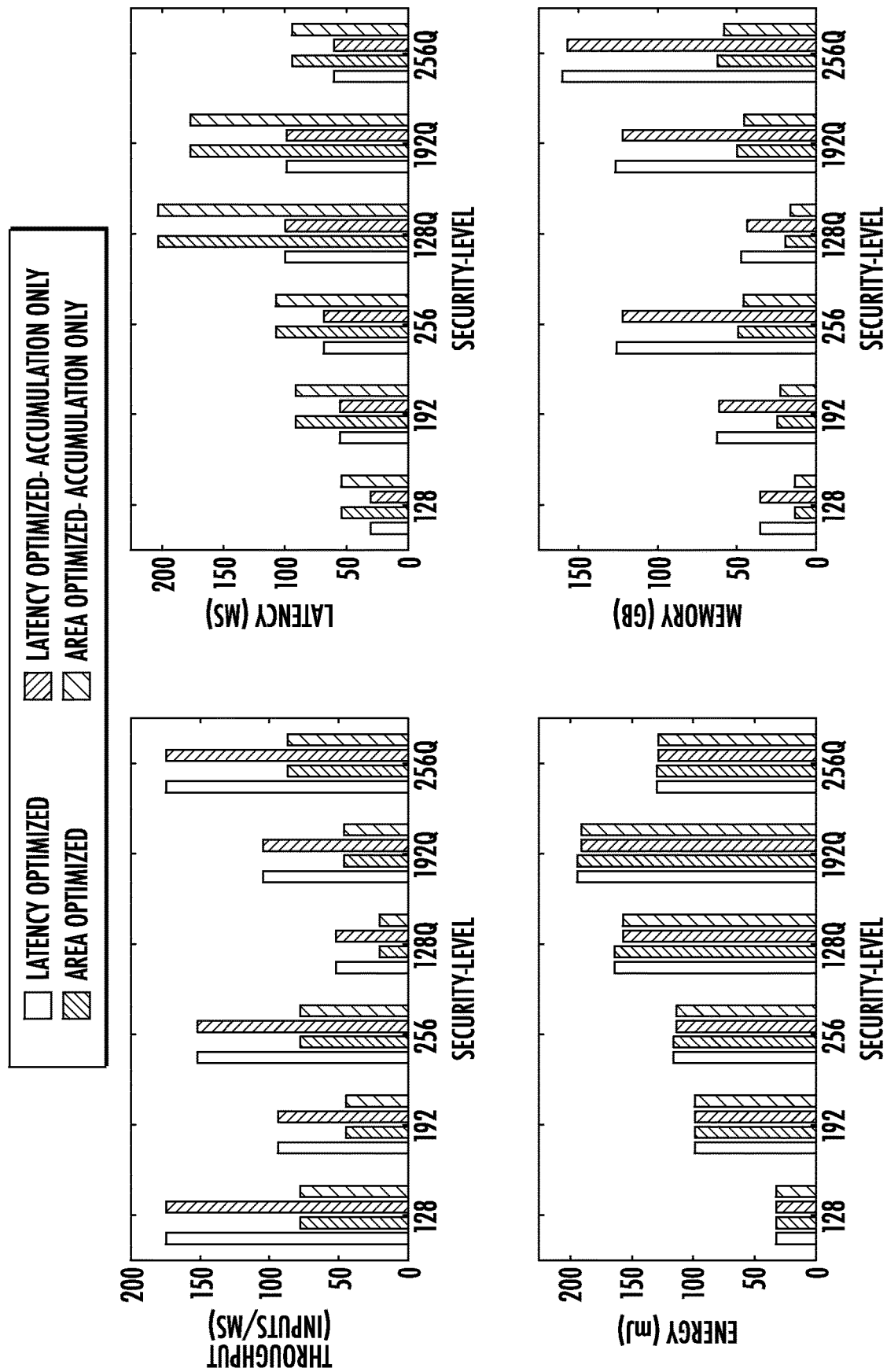
FIG. 4 shows the throughput, latency, energy consumed, and memory required for one MemFHE-server pipeline with different parameter settings in some embodiments according to the invention.

FIG. 4 shows the throughput, latency, energy consumed, and memory required for one MemFHE-server pipeline with different parameter settings. We compare the throughput-optimized and area-optimized implementations of the pipeline. The two implementations differ in the way they pipeline NTT/INTT. While the area-optimized version follows the stage-wise pipelining mechanism discussed in Section 2.2.3, the throughput-optimized design implements a finer-grained pipeline. It further breaks an NTT stage into three pipeline stages, first for multiplication with twiddle, second for reduction of the product and addition/subtraction, and the third for final reduction and data transfer to the next stage.

Throughput-Optimized MemFHE:

We observe that the four design metrics change significantly with the security levels. Throughput is highly dependent on Q, the bitwidth of server-side computations. More precisely, throughput varies approximately with $(\log_2 Q)^2$. This happens because the slowest operation of the pipeline, i.e. the coefficient-wise multiplication, has an implementation latency of $O(Q^2)$ in MemFHE. MemFHE's latency is dependent on $Q^2$ as well as the polynomial degree of input ciphertext, n, and parameter $d_r$ and varies approximately with $n \cdot d_r \cdot (\log_2 Q)^2$. MemFHE-server consumes a total energy of 34 mJ (164 mJ) for processing an input in 128-bit classical (quantum-safe) FHE setting. While the quantum-safe implementations consume higher energy than their classical counterparts, the difference reduces as the security-level increases. The total memory consumed by MemFHE's server changes with different parameter settings as well. It varies approximately with $n \cdot N \cdot d_g$, consuming 37 GB (47 GB) for a complete server pipeline running 128-bit classical (quantum-safe) FHE. We further observe that the accumulation of cryptographic accumulator, ACC, consumes on average 96.5% of the total memory requirement of the server pipeline, while contributing 99.7% to the total latency. Accumulation makes up 99.9% of the total bootstrapping computational effort. Hence, this effectively represents the performance of bootstrapping.

Area-Optimized MemFHE:

While MemFHE provides extensive throughput benefits, it takes considerable amount of area. Moreover, since memory is the main resource in MemFHE, we optimized our implementation for area. We observe that an area-optimized MemFHE-server pipeline consumes 2.5× less memory resources on average as compared to the throughput-optimized design, while reducing the throughput by approximately 2.2×. In contrast, the latency increases by 75%. This happens because we reduce the number of pipeline stages by 3× in the area-optimized design but at the same time increase the latency of each pipeline stage by 2.2×. Since the operations remain the remain in both the designs, their total energy consumption is similar. This highlights one of the advantages of PIM as pipelining doesn't have operational and storage overhead since outputs of most operations are generated in the memory block and hence stored inherently.

TABLE 2

MemFHE Key Sizes (inn MB)

| | STD128 | STD192 | STD256 | STD128Q | STD192Q | STD256Q |
|---|---|---|---|---|---|---|
| $EK_S$ | 253 | 925 | 1269 | 1719 | 1750 | 1013 |
| $EK_B$ (AP) | 322 | 897 | 1920 | 1150 | 2304 | 1792 |
| $EK_B$ (GINX) | 14 | 39 | 60 | 50 | 72 | 56 |
| Total (AP) | 575 | 1822 | 3189 | 2869 | 4054 | 2805 |
| Total (GINX) | 267 | 964 | 1329 | 1769 | 1822 | 1069 |

5.3 MemFHE-Server Scalability

We take the area-optimized MemFHE for different security-levels and scale it to the given memory size. MemFHE has a minimum memory requirement, which is storage needed for the refreshing and switching keys. The different key sizes in MemFHE are presented in Table 2. To scale down from a pipeline's ideal memory size described in Section 5.2 and FIG. 4, we reduce the number of NTT cores. To scale up, we increase the number of parallel pipelines.

Figure 5:
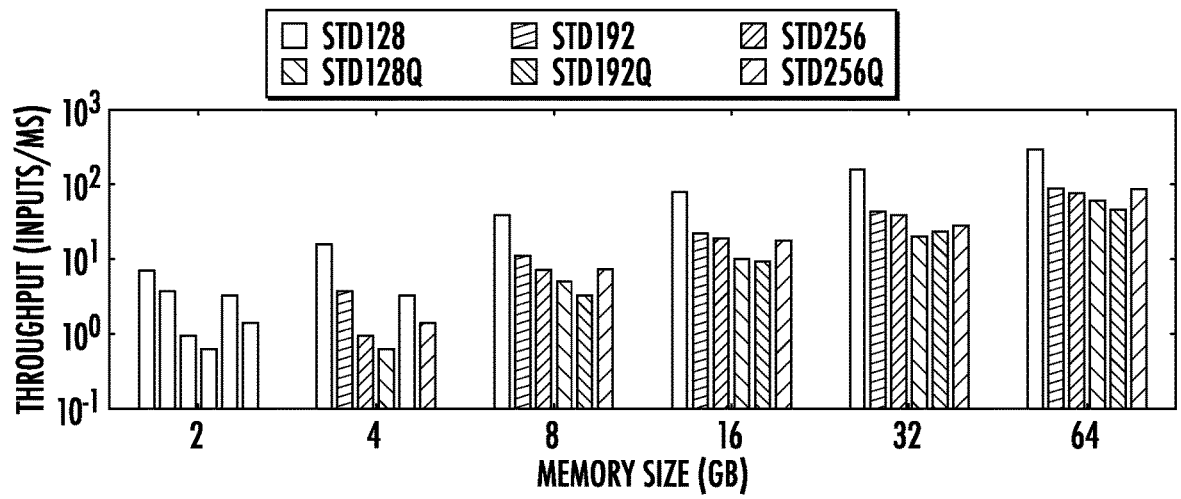
FIG. 5 shows the throughput of the server for different security levels under different memory constraints in some embodiments according to the invention.

FIG. 5 shows the throughput of the server for different security levels under different memory constraints. Missing bars in the figure show the cases when the available memory is not sufficient to implement MemFHE. We observe that MemFHE's throughput changes almost linearly with the total memory availability. It increases from the ideal 77 inputs/ms with 14 GB memory consumption to 307 inputs/ms with 64 GB for 128-bit security level, while decrease to 7 inputs/ms with 2 GB memory size. However, in some cases the change isn't linear. For example, for the quantum-safe 128-bit security configuration, MemFHE's throughput of 20 inputs/ms doesn't change when going from the ideal 20 GB to 32 GB. This happens because the increase in memory is not sufficient to support two pipelines. At the same time, increasing the memory availability further to 64 GB increases the throughput by 3× to 61 inputs/ms because 64 GB memory has enough resources to fit three STD128Q pipelines.

5.4 MemFHE Client Analysis

Figure 6A:
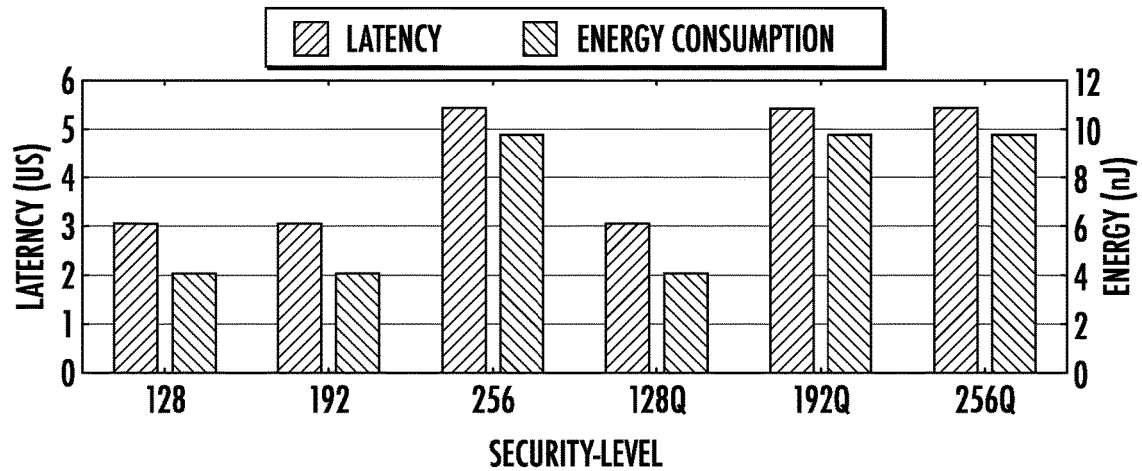
FIG. 6A shows the encryption latency and energy consumption for MemFHE-client at different security levels for a bit in some embodiments according to the invention.

MemFHE-client encrypts bits to ciphertexts and decrypts processed ciphertexts back to bits. FIG. 6a shows the encryption latency and energy consumption for MemFHE-client at different security levels for a bit. Decryption involves the same operations and has roughly the same latency as that of encryption. The latency of encryption depends on the ciphertext modulus, q, and the polynomial degree, n. As expected, the dot product a·s is the slowest operation in encryption, taking 98% of the total latency. Encrypting a bit to a 128-bit (256-bit) quantum-safe ciphertext takes 3 us (5.5 us), while it consumes 4 nJ (9.8 nJ) of energy.

Figure 6B:
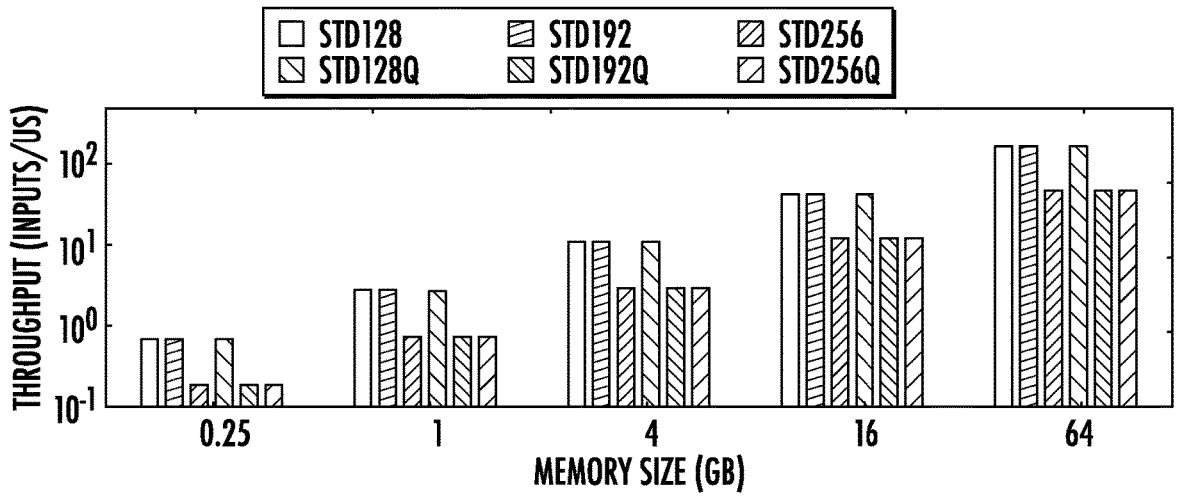
FIG. 6B shows how the throughput of the MemFHE-client changes with the available memory sizes in some embodiments according to the invention.

MemFHE requires a total of 128 KB (256 KB) memory (one memory block) for generating a 128-bit (256-bit) quantum-safe ciphertext. However, similar to MemFHE-server, the client is also scalable and employs multiple encrypting-decrypting memory blocks for processing multiple inputs in parallel. FIG. 6b shows how the throughput of the MemFHE-client changes with the available memory sizes. The figure shows the combined encrypt-decrypt throughput. Each memory block in MemFHE can be dynamically configured to run either encryption or decryption. We observe that the client's throughput increases linearly with the increase in the total memory size, going from 0.2 inputs/us for 256 KB memory to nearly 47 inputs/us for 64 MB for quantum-safe 256-bit encryption.

5.5 Arithmetic Operations in MemFHE

In this subsection, we show the end-to-end performance of MemFHE while implementing addition and multiplication. We utilize Kogge-Stone adders for addition operation as well as accumulation of partial products during multiplication. This reduces the critical path of the circuits and hence, the end-to-end latency for an input. Provided sufficient independent inputs, MemFHE can implement all these operations with the same throughput as shown in Section 5.2, processing up to 174 inputs/ms at 256-bit quantum-safe security.

Figure 7:
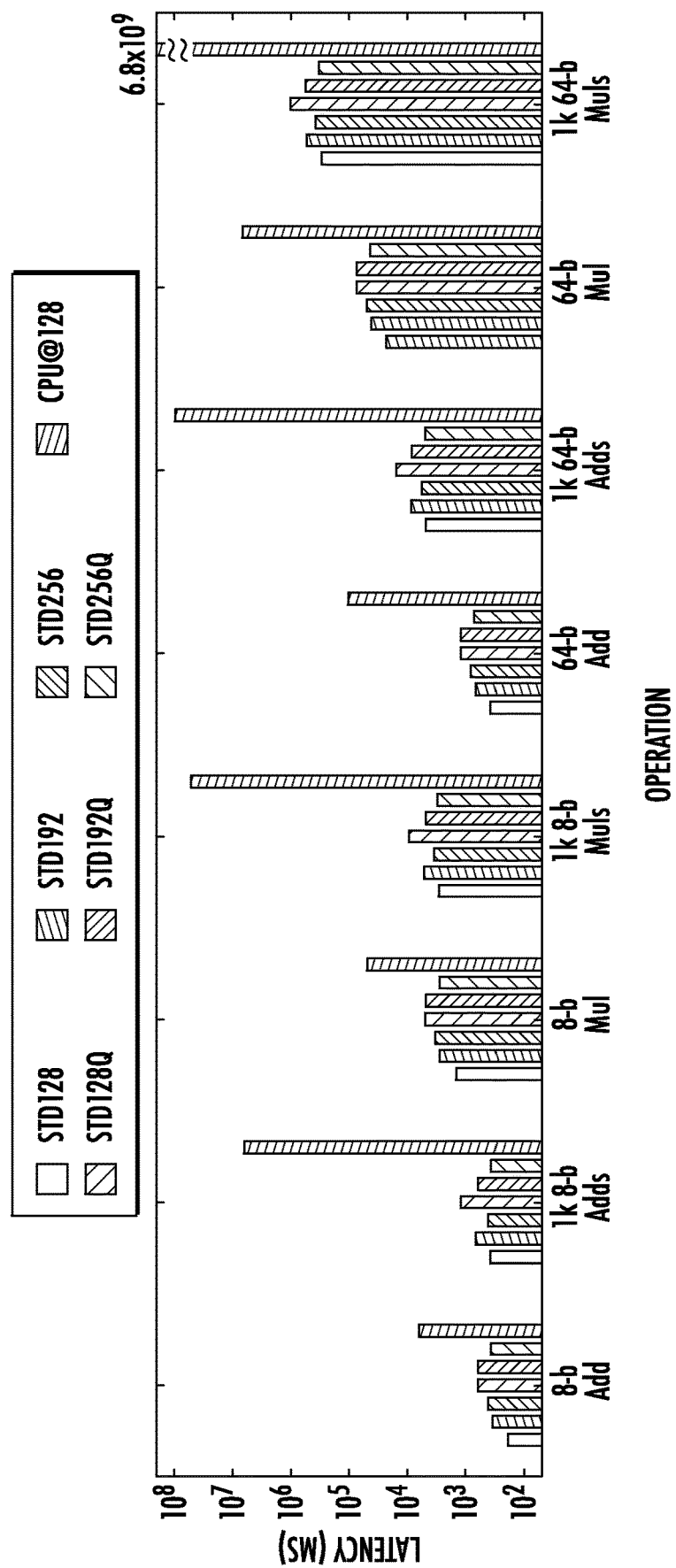
FIG. 7 shows the latency of running different types of additions and multiplications in MemFHE pipeline for various security settings in some embodiments according to the invention.

FIG. 7 shows the latency of running different types of additions and multiplications in MemFHE pipeline for various security settings. We observe that for individual operations, the latency is limited by their critical path. The latencies for individual addition vary with $O(\log_2 b)$, where b is the bitwidth of operation, taking 353 ms (705 ms) for an 8-bit (64-bit) addition while providing 256-bit quantum-safe security. For multiplication, the latency varies with $O(b.\log_2 b)$, taking 2.8 s (45 s) for an 8-bit (64-bit) multiplication.

Implementing 1024 independent additions and multiplications does not increase the latency significantly. Instead, these independent inputs fill up MemFHE's pipeline, which was otherwise severely underutilized. For example, performing 1024 8-bit additions/multiplication take only twice the total time as that for single addition/multiplication in 128-bit quantum-safe setting. For 256-bit quantum-safe FHE, the latency for 1024 8-bit additions/multiplications is actually similar to that for a single addition/multiplication. This happens because MemFHE pipeline for STD256Q is much deeper than that of STD128Q, allowing more operations to fill up the pipeline. Even for 1024 64-bit multiplications, MemFHE is at most 13× slower than one 64-bit multiplication. Hence, MemFHE truly shines when there are enough independent operations to fill the pipeline.

TABLE 3

Workloads for Learning in MemFHE

| Dataset | Network Topology | Accuracy | #GateOps |
|---|---|---|---|
| MNIST | C-B-A-P-C-P-F-B-A-F[20] | 99.54% | 856K |
| CIFAR-10 | [C-B-A-C-B-A-P] × 3-F-F[4] | 92.54% | 211M |
| ImageNet | ShuffleNet [55] | 69.4% | L1G |
| Penn Treebank [33] | LSTM: t-step 25, 300-unit layer; ReLU [33] | 89.8 PPW | 24.4M |

C: convolution layer; A: activation layer; B: batch normalization; P: pooling layer; F: fully-connected layer; PPW: perplexity per word.

Lastly, FIG. 7 also shows the latency of different addition and multiplication operations, normalized to MemFHE, for an Intel i7-9700 CPU with 64 GB of RAM in 128-bit classical security setting in log scale. The results were obtained using single-threaded implementation of the state-of-the-art PALISADE library. We observe that CPU is on average 35× (295×) slower than MemFHE for individual 8-bit (64-bit) arithmetic operations. For 1024 arithmetic operations, MemFHE is on average 20573× faster than CPU. This is due to the highly pipelined architecture of MemFHE that can deliver higher throughput for large data. We also compare MemFHE with Nvidia GTX 1080 GPU with 8 GB memory. We see that MemFHE is on average 53× faster than GPU for 32-element long vector additions and multiplications. However, the latency of FHE computations scales linearly with vector-length beyond 8, while MemFHE is able to maintain the same latency for a vector-length of 160 for 32-bit multiplications. This makes MemFHE up to 265× faster than GPU.

5.6 Learning in MemFHE

We show MemFHE performance for complicated learning tasks. Our evaluation is inspired from the CPU implementation of TFHE-based deep neural networks (DNN), which we refer to as TDNN for simplicity. TDNN converts DNN operations into TFHE compatible functions. We use the same functions to evaluate MemFHE as it also supports TFHE. Table 3 details the datasets and the corresponding network topologies used for evaluation. TDNN works in both fully homomorphic (TDNN-FHE) mode as well as leveled mode (TDNN-Lvl). While TDNN-FHE bootstraps each gate operation, TDNN-Lvl bootstraps only higher-level operations like polynomial multiplications and additions.

Figure 8A:
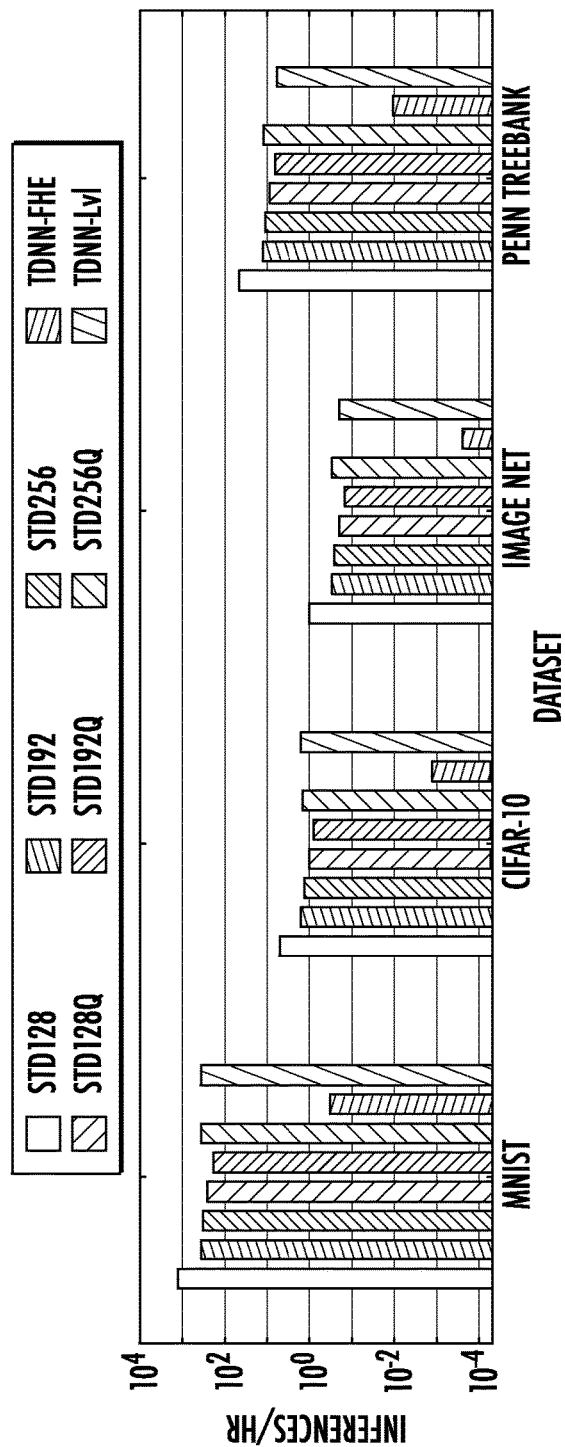
FIG. 8A shows the inference throughput of MemFHE and TDNN over various datasets. MemFHE is scaled to have a total of 64 GB memory size in some embodiments according to the invention.

FIG. 8a shows the inference throughput of MemFHE and TDNN over various datasets. MemFHE is scaled to have a total of 64 GB memory size. While MemFHE provides a range of classical and quantum-safe security guarantees, TDNN provides 163-bit (152-bit) security guarantee in FHE (leveled) mode. We observe that as compared to TDNN-FHE, MemFHE provides on average 2007× higher throughput (inference/s) for classical FHE. Moreover, MemFHE has 827× higher throughput while ensuring quantum-safe FHE while TDNN-FHE just provides classical security. We also observe that MemFHE in quantum-safe provides similar throughput as TDNN-Lvl. This is a huge improvement because leveled HE accelerates computations on encrypted data by performing multiple operations without bootstrapping. However, it limits the achievable security levels. Moreover, encrypting in leveled mode is dependent on the complexity of target operation and cannot implement arbitrary operations. MemFHE achieves the throughput of a leveled implementation while running FHE.

Figure 8B:
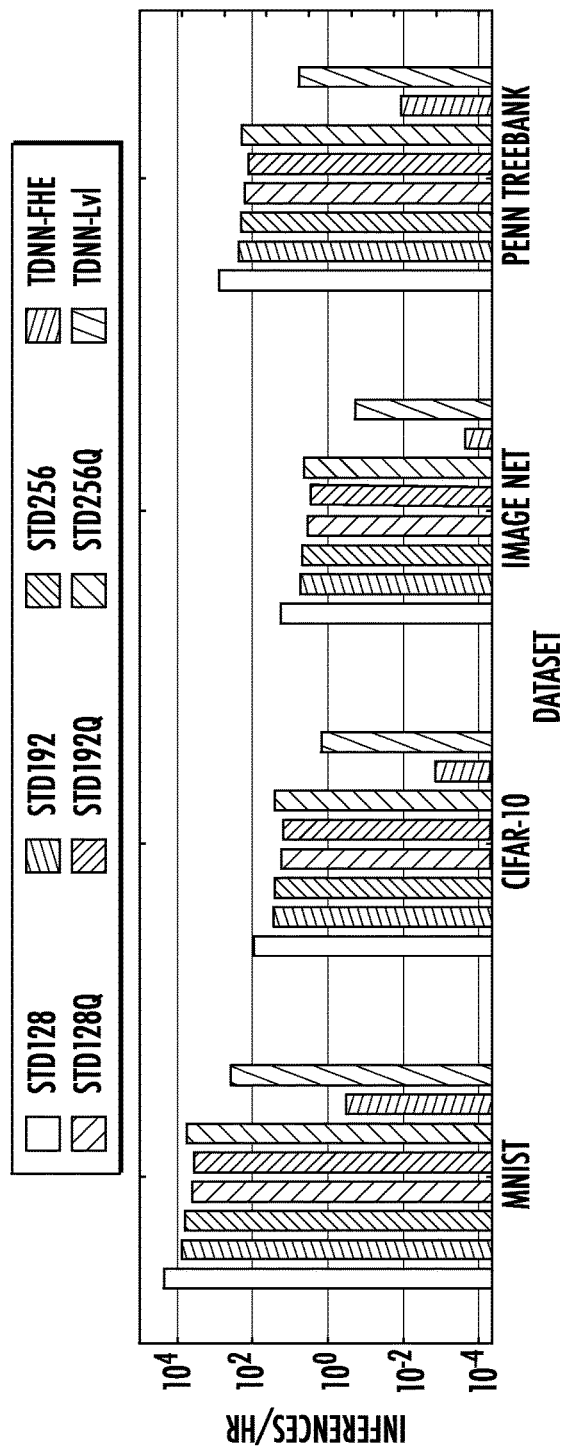
FIG. 8B shows the inference throughput of MemFHE and TDNN over various datasets. MemFHE is scaled to have a total of 1 TB memory size in some embodiments according to the invention.

TDNN runs on an Intel Xeon E7-4850 CPU with 1 TB DRAM. To perform a similar memory size evaluation, we also scale MemFHE up to 1 TB memory. FIG. 8 summarizes the results. We observe that MemFHE's throughput further increases on average by 19× (17×) for classical (quantum-safe) FHE. This translates to four orders of magnitude higher throughput than TDNN-FHE. This huge improvement in MemFHE comes from (i) significant reduction in total data-transfers and (ii) the significantly higher number of processing in memory cores. Unlike traditional systems, off-chip data-transfers in MemFHE consists only of the communication between client and server. The high density of memory allows us to have a large number of PIM-enabled cores in the system, allowing for higher parallelism and deeper pipelining.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of various embodiments. This description should be read to include one or at least one and the singular also includes the plural unless it is obvious that it is meant otherwise.

It will be appreciated that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present inventive concept. Also, common but well-understood elements that are useful or necessary in a commercially feasible embodiment are often not depicted in order to facilitate a less obstructed view of these various embodiments. The same reference numbers may be used to describe like or similar parts. Further, while several examples have been disclosed herein, any features from any examples may be combined with or replaced by other features from other examples. Moreover, while several examples have been dis-closed herein, changes may be made to the disclosed examples within departing from the scope of the claims.

Those skilled in the art will recognize that a wide variety of modifications, alterations, and combinations can be made with respect to the above described embodiments without departing from the scope of the inventive concept, and that such modifications, alterations, and combinations are to be viewed as being within the ambit of the inventive concept.

The terminology used herein is for the purpose of describing embodiments only and is not intended to be limiting to other embodiments. As used herein, the singular forms "a", "an" and "the" are intended to include the plural forms as well, unless the context clearly indicates otherwise. It will be further understood that the terms "comprises," "comprising," "includes" and/or "including", "have" and/or "having" when used herein, specify the presence of stated features, integers, steps, operations, elements, and/or components, but do not preclude the presence or addition of one or more other features, integers, steps, operations, elements, components, and/or groups thereof. Elements described as being "to" perform functions, acts and/or operations may be configured to or other structured to do so.

Unless otherwise defined, all terms (including technical and scientific terms) used herein have the same meaning as commonly understood by one of ordinary skill in the art to which various embodiments described herein belong. It will be further understood that terms used herein should be interpreted as having a meaning that is consistent with their meaning in the context of this specification and the relevant art and will not be interpreted in an idealized or overly formal sense unless expressly so defined herein.

Terms such as "substantially," "about," "approximately" or the like as used in referring to a relationship between two objects is intended to reflect not only an exact relationship but also variances in that relationship that may be due to various factors such as the effects of environmental conditions, common error tolerances, manufacturing variances, or the like. It should further be understood that although some values or other relationships may be expressed herein without a modifier, these values or other relationships may also be exact or may include a degree of variation due to various factors such as the effects of environmental conditions, common error tolerances, manufacturing variances, or the like.

In some embodiments, the term "about" generally refers to a range of numeric values that one of skill in the art would consider equivalent to the recited numeric value or having the same function or result. For example, "about" may refer to a range that is within ±1%, ±2%, ±5%, ±7%, ±10%, ±15%, or even ±20% of the indicated value, depending upon the numeric values that one of skill in the art would consider equivalent to the recited numeric value or having the same function or result. Furthermore, in some embodiments, a numeric value modified by the term "about" may also include a numeric value that is "exactly" the recited numeric value. In addition, any numeric value presented without modification will be appreciated to include numeric values "about" the recited numeric value, as well as include "exactly" the recited numeric value. Similarly, the term "substantially" means largely, but not wholly, the same form, manner or degree and the particular element will have a range of configurations as a person of ordinary skill in the art would consider as having the same function or result. When a particular element is expressed as an ap-proximation by use of the term "substantially," it will be understood that the particular element forms another embodiment.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to im-ply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "include," "can include," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof Additionally, the words "herein," "above," "below," and words of similar import, when used in this application, refer to this application as a whole and not to any particular portions of this application. Where the con-text permits, words in the above Detailed Description using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Disjunctive language such as the phrase "at least one of X, Y, or Z," unless specifically stated otherwise, is otherwise understood with the context as used in general to present that an item, term, etc., may be either X, Y, or Z, or any combination thereof (non-limiting examples: X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described elsewhere herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

These and other changes can be made to the invention in light of the detailed description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above detailed description section explicitly de-fines such terms. Accordingly, the actual scope of the invention encompasses not only the disclosed examples, but also all equivalent ways of practicing or implementing the invention under the claims. Any combination of one or more computer readable media may be utilized. The computer readable media may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wired, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages, such as a programming language for a FPGA, Verilog, System Verilog, Hardware Description language (HDL), and VHDL. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computer environment or offered as a service such as a Software as a Service (SaaS).

Some embodiments are described herein with reference to flowchart illustrations and/or block diagrams of methods, systems, and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall support claims to any such combination or subcombination.

What is claimed:

1. A method for fully homomorphic processing of ciphertexts, the method comprising:
   receiving, at a computing platform that comprises a server operatively coupled to a processing-in-memory (PIM) device, one or more ciphertexts produced with a Ring-Gentry-Sahai-Waters (RGSW) based fully homomorphic encryption system that permits evaluation of arbitrary functions on encrypted data;
   generating, from the ciphertexts, corresponding input ciphertexts, each input ciphertext including a ciphertext polynomial and a ciphertext integer;
   processing the input ciphertexts entirely in-situ within the PIM device, wherein the processing includes performing bootstrapping operations in a pipelined architecture, and dynamically adjusting one or more bootstrapping parameters during the bootstrapping operations based on structural characteristics of the input ciphertexts, wherein the structural characteristics comprise at least one of a polynomial degree, a noise level, or a ciphertext modulus, and wherein the bootstrapping operations include executing stage-wise number-theoretic transform and inverse number-theoretic transform operations using an in-memory coefficient-row mapping architecture in which each stage operates on coefficient pairs resident in a common memory row and transfers intermediate results to a next stage through column-wise data movement internal to the PIM device; and
   performing, on the input ciphertexts, at least one homomorphic operation, the at least one homomorphic operation comprising ciphertext addition, ciphertext multiplication, key switching, or modulus switching, wherein each input ciphertext remains in encrypted form within the PIM device during the at least one homomorphic operation.

2. The method of claim 1 wherein bootstrapping includes:
   bootstrapping the input ciphertext with an encrypted private key that is associated with the ciphertexts, to provide an output ciphertext having reduced noise compared to the input ciphertext.

3. The method of claim 1 wherein bootstrapping further includes:
   setting an initial value of an accumulator; and
   decomposing polynomials of the input ciphertexts to be compatible with a refreshing key associated with the ciphertexts received at the server.

4. The method of claim 3 wherein setting the initial value of the accumulator includes:
   translating boolean functions into at least one homomorphic computation step to provide respective integer outputs; and
   mapping the respective integer outputs to respective bootstrapping compatible polynomials using search based processing-in-memory operations.

5. The method of claim 3 wherein decomposing the polynomials of the input ciphertexts includes:
  decomposing the respective bootstrapping compatible polynomials to coefficients of the respective bootstrapping compatible polynomials.

6. The method of claim 5 further comprising:
  performing Number Theoretic Transform (NTT) transforms on the respective bootstrapping compatible polynomials to provide a frequency domain equivalent of the respective bootstrapping compatible polynomials.

7. The method of claim 6 further comprising:
  performing row-parallel multiplication between the frequency domain equivalent of the respective bootstrapping compatible polynomials and respective refreshing keys to provide respective portions of an N dimensional vector; and
  adding the respective portions of an N dimensional vector to provide an accumulator pipeline output.

8. The method of claim 7 further includes:
  performing inverse NTT transforms on the accumulator pipeline output to generate an accumulator output.

9. The method of claim 1 further comprising:
  receiving unencrypted data at a client; and
  encrypting the unencrypted data using the RGSW based fully homomorphic encryption system using a client processing-in-memory device, that is operatively coupled to the client, to perform operations on the unencrypted data by the client processing-in-memory device, in-situ.

10. The method of claim 1, wherein the fully homomorphic encryption system comprises a third-generation Ring-Gentry-Sahai-Waters (RGSW)-based system configured to support evaluation of arbitrary functions on encrypted data.

11. The method of claim 1, further comprising storing, in a plurality of local memory banks physically co-located with respective pipeline stages of the PIM device, digit-decomposed portions of a refreshing key.

12. The method of claim 1, wherein the bootstrapping operations further comprises:
  performing, in row-parallel fashion, a signed-digit decomposition of the ciphertext polynomials;
  executing stage-wise number-theoretic transform and inverse number-theoretic transform operations using an in-memory coefficient-row mapping architecture in which each stage operates on coefficient pairs resident in a common memory row and transfers intermediate results to a next stage through column-wise data movement internal to the PIM device.

13. The method of claim 1, wherein the one or more bootstrapping parameters includes at least one of decomposition base, decomposition depth, polynomial degree, modulus set, or pipeline stage width.

14. The method of claim 1, wherein the processing further includes selecting, for each bootstrapping operation, an accumulation path of either an algebraic-product (AP) type or a generalized-inverse-number-theoretic-transform (GINX) type, the selection being performed as a function of a statistical distribution of secret-key coefficients associated with the corresponding input ciphertext.

15. The method of claim 1, further comprising outputting, from the PIM device, encrypted output ciphertexts that encode respective results of the at least one homomorphic operation.

16. A method for fully homomorphic processing of ciphertexts, the method comprising:
  receiving, at a computing platform that comprises a server operatively coupled to a processing-in-memory (PIM) device, one or more ciphertexts produced with a Ring-Gentry-Sahai-Waters (RGSW) based fully homomorphic encryption system that permits evaluation of arbitrary functions on encrypted data;
  generating, from the ciphertexts, corresponding input ciphertexts, each input ciphertext including a ciphertext polynomial and a ciphertext integer;
  processing the input ciphertexts entirely in-situ within the PIM device, wherein the processing includes:
  performing bootstrapping operations in a pipelined architecture,
  selecting, for each bootstrapping operation, an accumulation path of at least one of an algebraic-product type or a generalized-inverse-number-theoretic-transform type, the selection being performed as a function of a statistical distribution of secret-key coefficients associated with a corresponding input ciphertext, and
  dynamically adjusting one or more bootstrapping parameters during the bootstrapping operations based on structural characteristics of the input ciphertexts, wherein the structural characteristics comprise at least one of a polynomial degree, a noise level, or a ciphertext modulus; and
  performing, on the input ciphertexts, at least one homomorphic operation, the at least one homomorphic operation comprising ciphertext addition, ciphertext multiplication, key switching, or modulus switching, wherein each input ciphertext remains in encrypted form within the PIM device during the at least one homomorphic operation.

* * * * *